(12) United States Patent
Hu et al.

(10) Patent No.: US 10,317,737 B2
(45) Date of Patent: Jun. 11, 2019

(54) ARRAY SUBSTRATE, DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Wei Hu, Beijing (CN); Ni Yang, Beijing (CN); Haijun Qiu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/101,662

(22) PCT Filed: Dec. 22, 2015

(86) PCT No.: PCT/CN2015/098270
§ 371 (c)(1),
(2) Date: Jun. 3, 2016

(87) PCT Pub. No.: WO2017/004949
PCT Pub. Date: Jan. 12, 2017

(65) Prior Publication Data
US 2017/0199409 A1    Jul. 13, 2017

(30) Foreign Application Priority Data

Jul. 7, 2015 (CN) .......................... 2015 1 0393397

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133345* (2013.01); *G02F 1/133707* (2013.01);
(Continued)

(58) Field of Classification Search
CPC ........... G02F 1/13394; G02F 1/134309; G02F 1/133345; G02F 1/133707; G02F 1/136286
See application file for complete search history.

(56) References Cited

U.S. PATENT DOCUMENTS 6,583,840 B1    6/2003  Inoue et al.
7,688,413 B2 *  3/2010  Ito .................. G02F 1/134363
                                                      349/141
(Continued)

FOREIGN PATENT DOCUMENTS

CN    1276588 A    12/2000
CN    2743872 Y    11/2005
(Continued)

OTHER PUBLICATIONS

The First Chinese Office Action dated Jun. 2, 2017; Appln. No. 201510393397.X.
(Continued)

*Primary Examiner* — Dung T Nguyen
(74) *Attorney, Agent, or Firm* — Ladas & Parry LLP

(57) ABSTRACT

An array substrate, a display panel and a display device are provided. The array substrate includes a base substrate and a plurality of sub pixels arranged on the base substrate, wherein each of the sub pixels includes a first electrode, a second electrode and a plurality of spacer strips, and the plurality of spacer strips is provided below the first electrode and the second electrode. By forming spacer strips which make a pixel electrode and a common electrode protruded on the array substrate, the horizontal electric field is
(Continued)

enhance, the longitudinal electric field is suppressed, and thus the transmittance can be improved.

18 Claims, 5 Drawing Sheets

(51) Int. Cl.
  *G02F 1/1337* (2006.01)
  *G02F 1/1343* (2006.01)
  *G02F 1/1362* (2006.01)
(52) U.S. Cl.
  CPC .. *G02F 1/134309* (2013.01); *G02F 1/136286* (2013.01); *G02F 1/134363* (2013.01); *G02F 2001/134345* (2013.01); *G02F 2001/134372* (2013.01); *G02F 2201/121* (2013.01); *G02F 2201/122* (2013.01); *G02F 2201/123* (2013.01); *G02F 2201/124* (2013.01)

(56) References Cited

U.S. PATENT DOCUMENTS

| | | | | |
|---|---|---|---|---|
| 7,755,723 B2* | 7/2010 | Ino | ................... | G02F 1/133555 349/114 |
| 8,310,642 B2* | 11/2012 | Woo | ................. | G02F 1/133707 349/141 |
| 8,654,292 B2* | 2/2014 | Kubota | ................ | H05K 999/99 349/138 |
| 2009/0021660 A1 | 1/2009 | Lu et al. | | |
| 2010/0302492 A1 | 12/2010 | Kubota et al. | | |

FOREIGN PATENT DOCUMENTS

| | | |
|---|---|---|
| CN | 101387806 A | 3/2009 |
| CN | 101900913 A | 12/2010 |
| CN | 103278979 A | 9/2013 |
| CN | 104914630 A | 9/2015 |

* cited by examiner

ARRAY SUBSTRATE, DISPLAY PANEL AND DISPLAY DEVICE

TECHNICAL FIELD

At least one embodiment of the present invention relates to an array substrate, a display panel and a display device.

BACKGROUND

A thin film transistor liquid crystal display (TFT-LCD) includes an array substrate, a color filter substrate and a layer of liquid crystal interposed between the two substrates for its basic structure. In the display, pixel electrodes and common electrodes are also included for controlling deflection of the liquid crystal. Generally, in the TFT-LCD, intensity of light can be control by controlling deflection of the liquid crystal molecules, and then by the filter effect of the color filter substrate, a colorful image display can be achieved.

A TFT-LCD includes an In-Plane Switching (IPS) mode and an Advanced-super Dimensional Switching (ADS) mode. In the IPS mode and the ADS mode, a multi-dimensional electric field is generated by a parallel electrical field generated by edges of the pixel electrodes or the common electrodes and a longitudinal electrical field generated between the pixel electrodes and the common electrodes, so that the rotation switching of the liquid crystal molecules at all orientations between the pixel electrodes or the common electrodes, right above the pixel electrodes or the common electrodes in the liquid crystal cell can be occurred, and thus operation efficiency of the plane orientated nematic liquid crystal can be improved, and light transmission efficiency can also be improved.

However, with the development of the technology, higher and higher requirement on the display effect of the electronic product has been proposed by the consumers. A display device having better display effect and higher light transmittance has been continuously sought for.

SUMMARY

At least one embodiment of the invention provides an array substrate, a display panel and a display device. By forming spacer strips which make a pixel electrode and a common electrode protruded on the array substrate, the horizontal electric field is enhance, the longitudinal electric field is suppressed, and thus the transmittance can be improved.

Embodiments of the invention provide an array substrate, comprising a base substrate and a plurality of sub pixcis arranged on the base substrate, wherein each of the sub pixels includes a first electrode, a second electrode and a plurality of spacer strips, and the plurality of spacer strips is provided below the first electrode and the second electrode.

For example, in the array substrate provided in one embodiment of the invention, the spacer strips include any shape selected from the group consisted of straight line shape, fold line shape, wave shape, saw tooth shape, and are shape.

For example, in the array substrate provided in one embodiment of the invention, the plurality of spacer strips is a plurality of straight line shaped spacer strips arranged in parallel.

For example, in the array substrate provided in one embodiment of the invention, in each of the sub pixels, the first electrode and the second electrode each includes portions correspondingly provided above the plurality of spacer strips.

For example, in the array substrate provided in one embodiment of the invention, the portions of the first electrode and the second electrode correspondingly provided above the plurality of spacer strips are protrusions.

For example, in the array substrate provided in one embodiment of the invention, the first electrode and the second electrode are provided at different layers, and a first insulation layer is provided between the first electrode and the second electrode, the second electrode is located above the first electrode, in each of the sub pixels, the second electrode includes a plurality of second electrode strips, and in the layer in which the second electrode is located, at positions corresponding to the plurality of spacer strips, one of the second electrode strips is provided every other spacer strip.

For example, in the array substrate provided in one embodiment of the invention, the first electrode is a plate electrode, or the first electrode includes a plurality of first electrode strips;

in the case that the first electrode includes a plurality of first electrode strips, in the layer in which the first electrode is located, at the positions corresponding to the plurality of spacer strips, one of the first electrode strips is provided every other spacer strip, and two adjacent spacer strips respectively correspond to the first electrode strip and the second electrode strip.

For example, in the array substrate provided in one embodiment of the invention, the second electrode is a slit electrode or a comb electrode.

For example, in the array substrate provided in one embodiment of the invention, the first electrode and the second electrode are provided at the same layer, in each of the sub pixels, the first electrode includes a plurality of first electrode strips and the second electrode includes a plurality of second electrode strips, and in the layer in which the first electrode and the second electrode are located, the first electrodes and the second electrodes are alternately provided at positions corresponding to the plurality of spacer strips or alternately provided every other spacer strip.

For example, in the array substrate provided in one embodiment of the invention, the first electrode and the second electrode have a cross section in saw tooth structure in a direction perpendicular to a direction of the plurality of spacer strips.

For example, in the array substrate provided in one embodiment of the invention, the spacer strip has a cross section in any shape selected from the group consisted of trapezoid, triangle, semi-circular, step shape, and peak shape.

For example, the array substrate provided in one embodiment of the invention further comprises a second insulation layer and a gate insulation layer, wherein the second insulation layer is located above the gate insulation layer and below the first electrode and the second electrode, the plurality of spacer strips is formed by a portion of the second insulation layer.

For example, the array substrate provided in one embodiment of the invention further comprises a gate insulation layer, wherein the gate insulation layer is located below the first electrode and the second electrode, and the plurality of spacer strips is formed by a portion of the gate insulation layer.

For example, the array substrate provided in one embodiment of the invention further comprises a plurality of data lines and a plurality of gate lines provided on the base substrate, wherein the plurality of spacer strips included in each of the sub pixels is extended in a direction parallel with extension direction of the gate lines or the data lines, or an angle formed between the extension direction of the plurality of spacer strips and the extension direction of the gate lines or the date lines is an acute angle, or the plurality of spacer strips included in each of the sub pixels is divided into at least two groups, and the spacer strips in different groups are extended in different directions.

For example, in the array substrate provided in one embodiment of the invention, the plurality of data lines and the plurality of gate lines are intersected to define the plurality of sub pixels arranged in an array.

At least one embodiment of the invention provides a display panel comprising the array substrate according to any embodiments as mentioned above.

At least one embodiment of the invention provides a display device comprising the display panel according to any embodiments as mentioned above.

BRIEF DESCRIPTION OF THE DRAWINGS

In order to more clearly describe the technical solution of the embodiments of the present invention, the attached drawings for the embodiments will be briefly described, it is obvious that the attached drawings in the following description are only relevant to some embodiments of the present invention, but not are intended to limit the present invention.

DESCRIPTION OF THE REFERENCE NUMERALS

Figure 1:
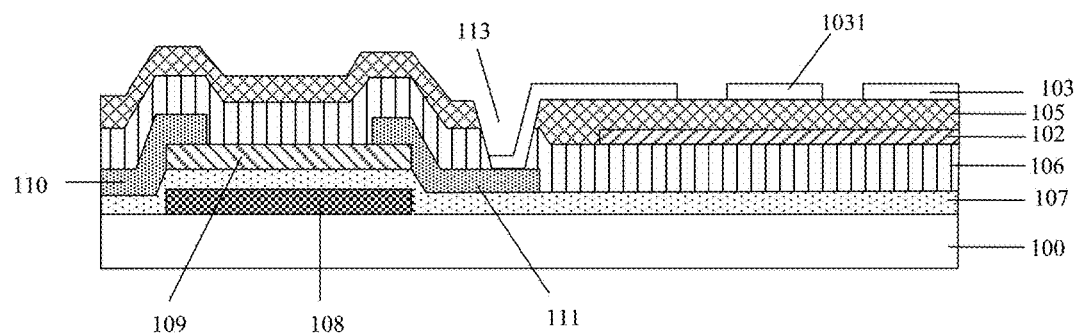
FIG. 1 is a schematic diagram of an array substrate in ADS mode.

10—array substrate; 20—counter substrate; 100—base substrate of the array substrate; 101—sub pixel; 102—first electrode; 1021—first electrode strip (electrode strip of the first electrode); 102—second electrode; 1031—second electrode strip (electrode strip of the second electrode); 104—spacer strip; 105—first insulation layer; 106—second insulation layer, 107—gate insulation layer; 108—gate electrode; 109—active layer; 110—source electrode; 111—drain electrode; 112—thin film transistor; 113—via; 114—data line; 115—gate line; 122—common electrode; 1221—electrode strip of the common electrode; 123—pixel electrode; 1231—electrode strip of the pixel electrode; 1232—slit of the pixel electrode; 131—intensity distribution of horizontal electric field in a conventional display panel; 132—intensity distribution of horizontal electric field of a display panel in the embodiment of the present invention; 200—base substrate of the counter substrate; 201—color film layer; 202—black matrix; 30—liquid crystal layer.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

For the general low power consumption ADS technology, pixel electrodes and common electrodes are respectively formed on corresponding planer structure layers. For example, in the case that the pixel electrodes are slit shaped electrodes and the common electrodes are plate electrodes, edge electric field formed by the potential difference between the pixel electrodes and the common electrodes includes two components, one of which is a horizontal electric field which facilitates the liquid crystal to be deflected in a horizontal direction, and the other is a longitudinal electric field which acts as interference. In a middle area on each slit of the pixel electrode and in a middle area between the slits, the horizontal electric field is relative weak, and the longitudinal electric field is relative strong, accordingly causing the transmittance to be little, and finally, influencing the transmittance of the whole liquid crystal panel. It is to be noted that the common electrodes may also be slit shaped electrodes, and the pixel electrodes are plate electrode. In this case, in a middle area on each slit of the common electrodes and in the middle area between the slits, the horizontal electric field is relative weak and the longitudinal electric field is relative strong, accordingly causing the transmittance to be relative little, and finally, influencing the transmittance of the whole liquid crystal panel.

For general IPS technology, the pixel electrodes and the common electrodes are formed at the same planer structure layer. For example, the pixel electrodes and the common electrodes each includes a plurality of electrode strips, and the edge electric field formed by the potential difference between the pixel electrode and the common electrode includes two components, one of which is the horizontal electric field which facilitates the liquid crystal to be deflected in the horizontal direction, and the other is the longitudinal electric field which acts as interference. In a middle area of each of the electrode strips of the pixel electrodes and a middle area of each of the electrode strips of the common electrodes, the horizontal electric field is relative weak, and the longitudinal electric field is relative strong, causing the transmittance to be relative little accordingly, and finally influencing the transmittance of the whole liquid crystal panel.

For example, as illustrated in FIG. 1, which is a partial sectional diagram illustrating an array substrate in ADS mode, the base substrate 100 is provided with a gate electrode 108. Above the layer in which the gate electrode 108 is located, a gate insulation layer 107 is provided. An active layer 109 is provided on the gate insulation layer 107. A source electrode 110 and a drain electrode 111 are provided on the active layer 109. The source electrode 110 and the drain electrode 111 are each connected with the active layer 109, and are provided at opposite sides of the active layer 109. A space is provided between the source electrode 110 and a drain electrode 111 to define a channel area. A thin film transistor includes the gate electrode 108, the gate insulation layer 107, the active layer 109, the source electrode 110 and the drain electrode 111. Above the layer in which the source electrode 110 and the drain electrode 111 are located, a second insulation layer 106 is provided. A first electrode 102 is provided on the second insulation layer 106. Above the layer in which the first electrode 102 is located, a first insulation layer 105 is provided. A second electrode 103 is provided on the first insulation layer 105. The second electrode 103 includes a plurality of second electrode strips 1031. The second electrode 103 is connected with the drain electrode 111 of the thin film transistor through a via 113. For example, the second electrode 103 may be a pixel electrode, and accordingly, the first electrode 102 may be a common electrode. The first electrode 102 and the second electrode 103 are both provided on a planar structure. Driving of the horizontal electric field is achieved by controlling potential difference formed between the pixel electrode and the common electrode.

With the continuous development of the display panel market, the product with high PPI (pixel per inch) becomes important development direction of the display product. However, the product with high ppi means that the pixel is even more small, which proposes challenge on a storage capacitance of the pixel. Although storage capacitance can be improved by thinning the first insulation layer 105, it will greatly reduce the function of the first insulation layer for protecting circuitry.

Hereinafter, several particular embodiments will be described.

First Embodiment

Figure 2A:
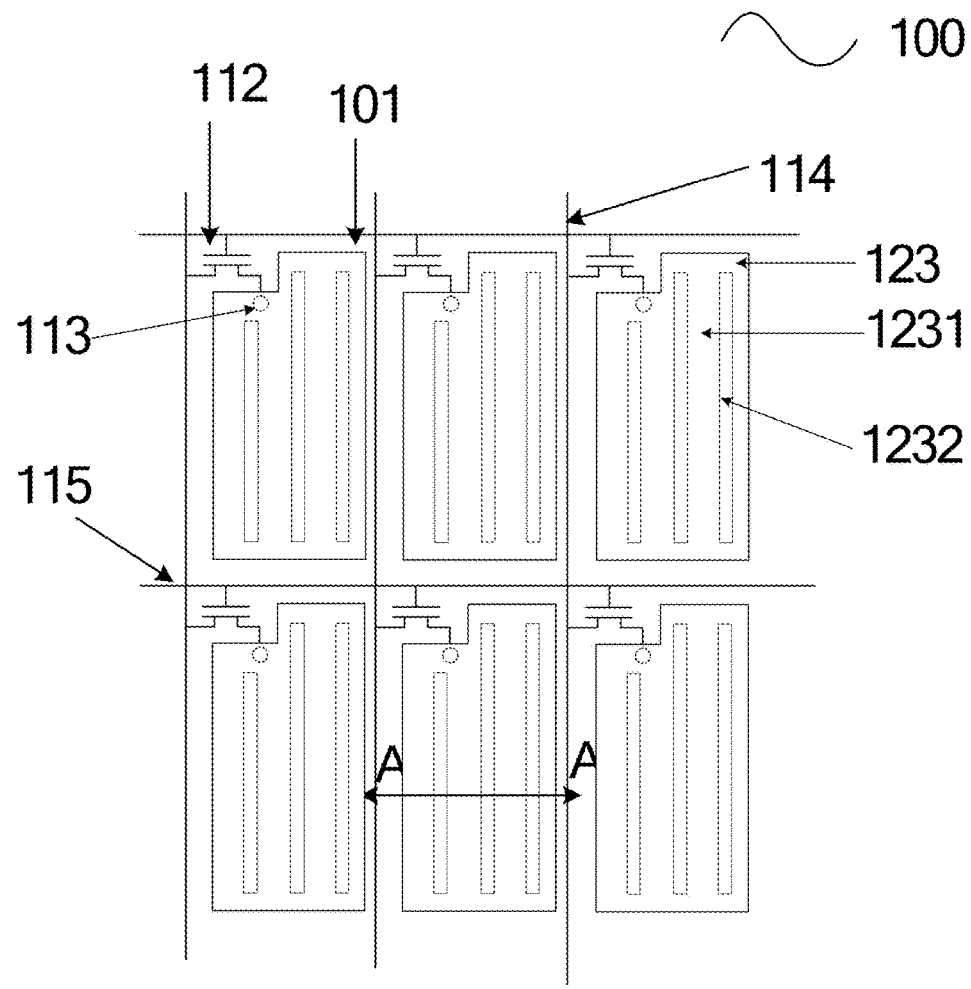
FIG. 2a is a schematic diagram of an array substrate provided by an embodiment of the present invention.

The present embodiment provides an array substrate, as illustrated in FIG. 2a, the array substrate includes a base substrate 100 and a plurality of sub pixels 101 arranged in an array on the base substrate 100.

As illustrated in FIG. 3a, FIG. 3b, FIG. 4a and FIG. 4b, each of the sub pixels includes a first electrode 102, a second electrode 103 and a plurality of spacer strips 104 provided below the first electrode 102 and the second electrode 103.

Figure 3A:
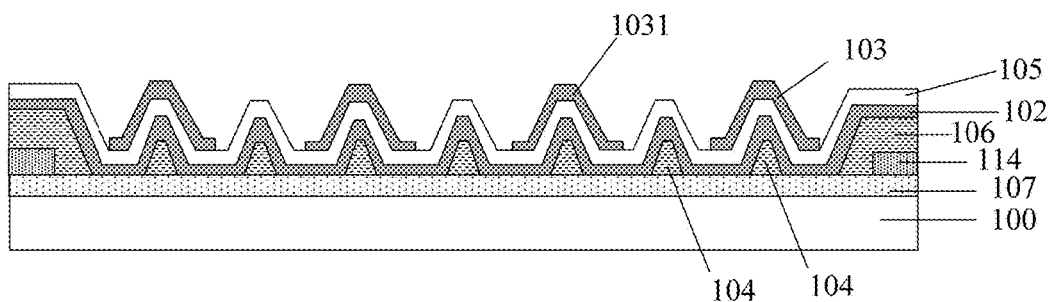
FIG. 3a is a schematic diagram of the array substrate in FIG. 2a (ADS mode) taken along a line A-A'.
Figure 3B:
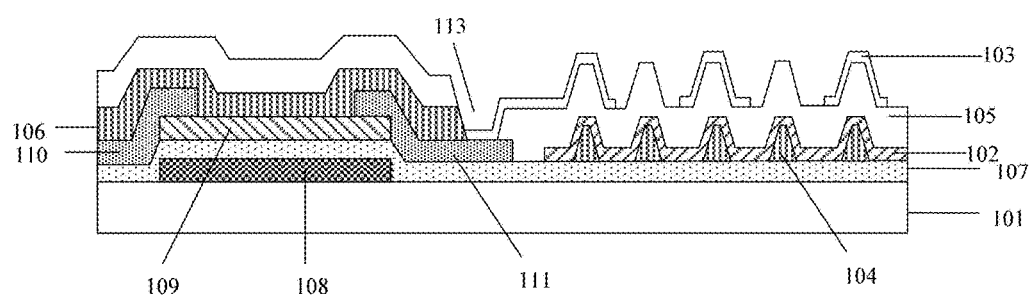
FIG. 3b is a schematic sectional diagram illustrating an array substrate (ADS mode) provided by an embodiment of the present invention.

For example, in an example of the present embodiment, as illustrated in FIG. 3a and FIG. 3b, in each of the sub pixel, the first electrode 102 and the second electrode 103 both include portions corresponding to the plurality of spacer strips 104. The second electrode 103 includes a plurality of second electrode strips 1031 provided corresponding to a part of the spacer strips in the plurality of spacer strips. For example, on the plurality of spacer strips 104, one second electrode strip 1031 is correspondingly provided on every other spacer strip 104. The first electrode 102 is a plate electrode, but the shape of the first electrode is not limited thereto. For example, the first electrode 102 may also include a plurality of first electrode strips. For example, the first electrode 102 includes a plurality of first electrode strips corresponding to the plurality of spacer strips.

Figure 4A:
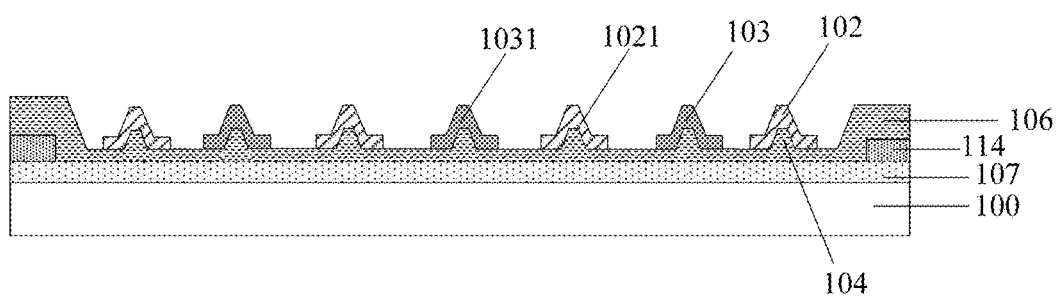
FIG. 4a is a schematic diagram of another array substrate (IPS mode) in FIG. 2a, taken along the line A-A'.
Figure 4B:
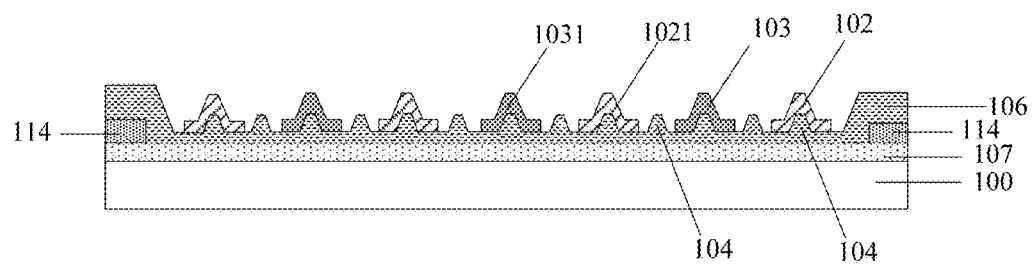
FIG. 4b is a schematic diagram illustrating the IPS mode array substrate in FIG. 2a in which a first electrode strip and a second electrode strip are alternately provided every other spacer strip, taken along the line A-A'.

For example, in an example of the present embodiment, as illustrated in FIG. 3a, FIG. 3b, FIG. 4a and FIG. 4b, each of the sub pixel 101 includes a first electrode 102 and a second electrode 103, which can be provided at the same layer (as illustrated in FIGS. 4a and 4b) or at different layers (as illustrated in FIGS. 3a and 3b), and on the base substrate, a plurality of spacer strips 104 is provided in each of the sub pixel 101. The first electrode 102 and the second electrode 103 are provided above the layer in which the plurality of spacer strips 104 is located. The first electrode 102 and the second electrode 103 both include portions correspondingly provided above the plurality of spacer strips 104. For example, the portions of the first electrode 102 and the second electrode 103 correspondingly provided above the plurality of spacer strips 104 is protrusion (convex) portions. For example, the portions of the first electrode 102 and the second electrode 103 correspondingly provided above the plurality of spacer strips 104 are protrusion portions with respect to portions which are not provided above the plurality of the spacer strips 104.

For example, as illustrated in FIG. 2a, the first electrode is a pixel electrode 123, and the second electrode is a common electrode, the first electrode is connected with the drain electrode of the thin film transistor through a via 113.

For example, the first electrode is a common electrode and the second electrode is a pixel electrode 123, and the second electrode is connected with the drain electrode of the thin film transistor through a via.

For example, as illustrated in FIG. 2a-FIG. 2d, an array substrate provided by an example of the present embodiment further includes a plurality of data lines and a plurality of gate line 5 provided on the base substrate 100, the plurality of data lines 114 and the plurality of gate lines 115 are insulated from each other, and are intersected to define a plurality of sub pixels 101 arranged in an array.

It is to be noted that the sub pixels 110 can be defined by the plurality of gate lines 115 and the plurality of data lines 114, but are not limited thereto. For example, one of the sub pixels 101 includes a gate line, a data line, a pixel electrode and a switching element. The sub pixel 101 is the smallest unit in the array substrate for displaying.

Figure 2B:
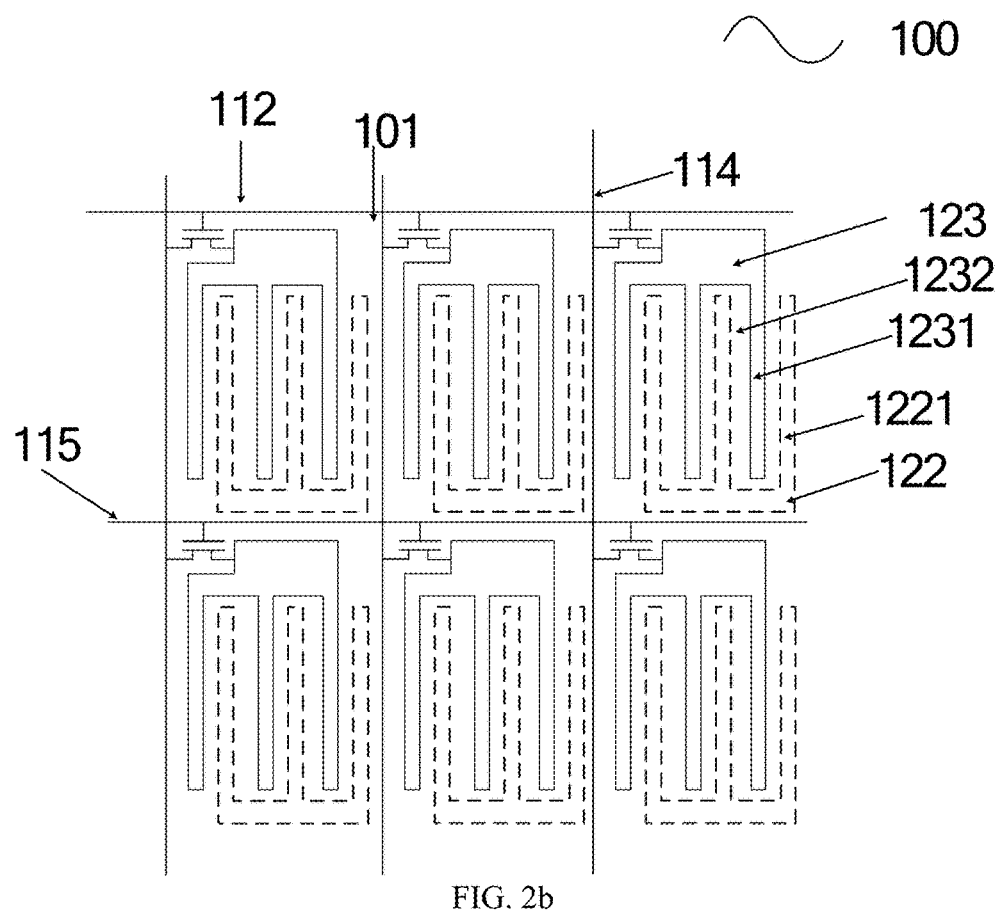
FIG. 2b is a schematic diagram illustrating pixel electrodes and common electrodes in an array substrate provided by an embodiment of the present invention.
Figure 2C:
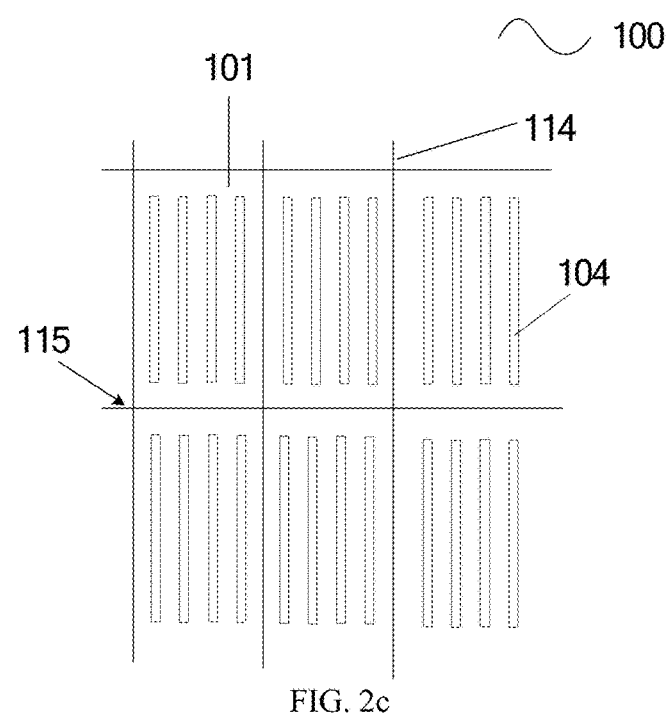
FIG. 2c is a schematic diagram illustrating straight line shaped spacer strips in an array substrate provided by an embodiment of the present invention.
Figure 2D:
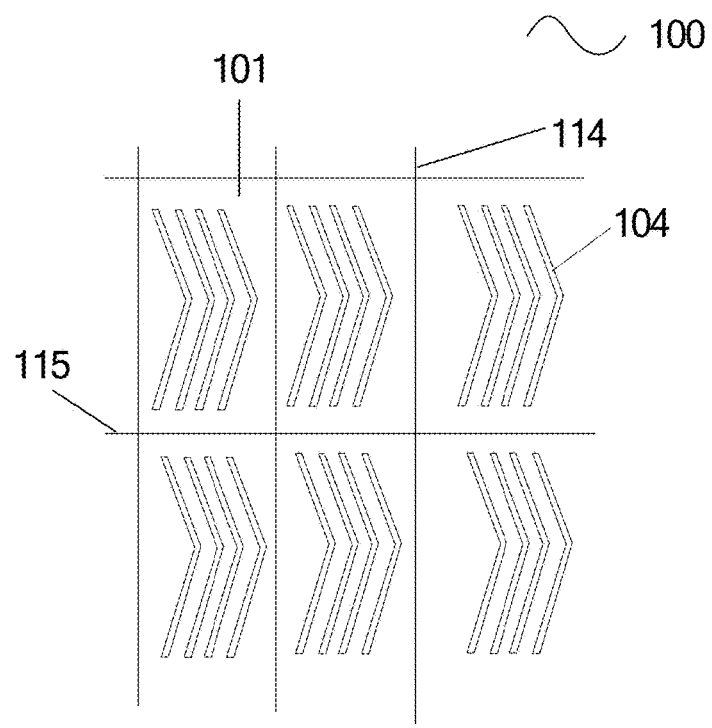
FIG. 2d is a schematic diagram illustrating fold line shaped spacer strips in an array substrate provided by an embodiment of the present invention.

For example, as illustrated in FIG. 2c to FIG. 2d, the spacer strip 104 is of straight-line shape, fold line shape, or the like, and also can be of wave shape, saw tooth shape, arc shape, or the like. There is no limitation thereon. Accordingly, the electrode strips corresponding to the plurality of spacer strips included in the first electrode and/or the second electrode can be of a shape corresponding to the shape of the plurality of the spacer strips. For example, in the case that the plurality of spacer strips are a plurality of straight line shaped spacer strips arranged in parallel, accordingly, the first electrode and/or the second electrode may include a plurality of straight line shaped electrode strips arranged in parallel.

For example, as illustrated in FIG. 2c, the plurality of spacer strips 104 are extended in a direction parallel with the extension direction of the data lines 115. The plurality of spacer strips 104 may also be extended in a direction parallel with the extension direction of the gate lines 114. Of course, any other direction can be used. For example, an angle formed between the extension direction of the plurality of spacer strips and the extension direction of the gate lines or the data lines is a acute angle, alternatively, the plurality of spacer strips included in each of the sub pixels can be divided into two groups, the spacer strips in each of the groups are extended in different direction. For example, the first electrodes and the second electrodes on each group of the spacer strips correspond to a domain.

For example, in an array substrate provided by an example of the present embodiment, in the case the first electrode and the second electrode are provided at different layers, the second electrode can be a slit electrode or a comb electrode, and, in each case, includes a plurality of second electrode strips. The slit electrode, for example, is illustrated in FIG. 2a. In FIG. 2a, the pixel electrode 123 is a slit electrode, includes a plurality of slits 1232, and between two adjacent slits, an electrode strip 1231 is located. The first electrode can be a plate electrode, as illustrated in FIG. 3a. Alternatively, the first electrode can also be a slit electrode or a comb electrode. The comb electrode has a plurality of teeth which become a plurality of electrode strips.

For example, in an array substrate provided by an example of the present embodiment, in the case that the first electrode and the second electrode are provided at the same layer, the first electrode and the second electrode are comb electrodes, and both include a plurality of electrode strips. The comb electrodes are, for example, illustrated in FIG. 2b. In FIG. 2b, the common electrode 122 and the pixel electrode 123 both are comb electrodes, the common electrode 122 includes a plurality of electrode strips 1221, and the pixel electrodes 123 include a plurality of electrode strips 1231.

As illustrated in FIG. 3a and FIG. 3b, in the case that the first electrode 102 and the second electrode 103 are provided at different layers, a first insulation layer 105 is provided between the first electrode and the second electrode, the second electrode 103 is located above the layer in which the first electrode 102 is located, in each of the sub pixels 101, the second electrode 103 includes a plurality of second electrode strips 1031, and in the layer in which the second electrode is located, at positions corresponding to the plurality of spacer strips 104, one of the second electrode strips 1031 is provided on every other spacer strip 104.

Figure 3C:
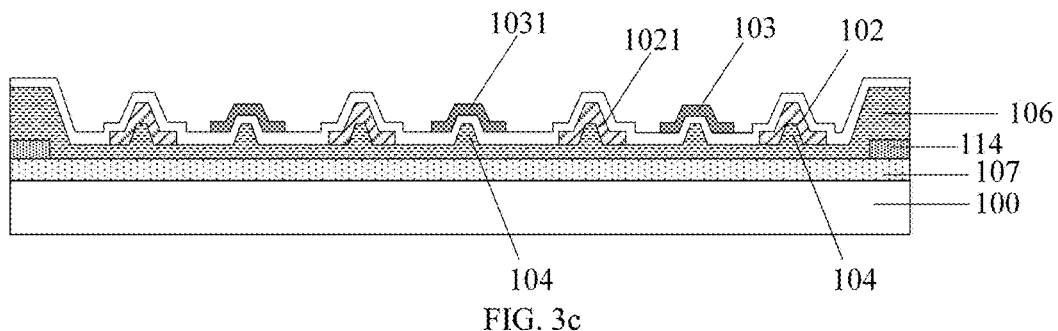
FIG. 3c is a schematic diagram illustrating the array substrate in FIG. 2a (ADS mode) in which a first electrode and a second electrode each includes a plurality of electrode strips, taken along the line A-A'.

For example, in an array substrate provided by an example of the present embodiment, in the case that the first electrode and the second electrode are provided at different layers, the first electrode is a plate electrode or the first electrode includes a plurality of first electrode strips. In the case that the first electrode includes a plurality of first electrode strips, as illustrated in FIG. 3c, in the layer in which the first electrode 102 is located, at positions corresponding to the plurality of spacer strips 104, one of the first electrode strips is provide on every other spacer strip 104, and the two adjacent spacer strips respectively correspond to the first electrode strip of the first electrode and the second electrode strip of the second electrode, but the present invention is not limited thereto.

As illustrated in FIG. 4a and FIG. 4b, in the case the first electrode 102 and the second electrode 103 are provided at the same layer, in each of the sub pixels 101, the first electrode 102 includes a plurality of first electrode strips 1021, the second electrode 103 includes a plurality of second electrode strips 1031, in the layer in which the first and second electrodes are located, at positions corresponding to the plurality of spacer strips 104, the first electrodes 1021 and the second electrodes 1031 are alternately provided, as illustrated in FIG. 4a. Alternatively, the first electrode strips 1021 and the second electrode strips 1031 can be alternately provided on every other spacer strip 104, as illustrated in FIG. 4b. The arrangement in FIG. 4b is advantageous for separating two adjacent electrode strips.

For example, in an array substrate provided by an example of the present embodiment, the first electrode 102 and the second electrode 103 have a cross section in saw tooth shaped structure in a direction perpendicular to the direction of the plurality of spacer strips (for example, the plurality of spacer strips are arranged in parallel), as illustrated in FIG. 3a, FIG. 3b, FIG. 4a and FIG. 4b. For example, the first electrode 102 and/or the second electrode 103 has a protrusion (convex) at the positions corresponding to each of the spacer strips 104.

For example, in an array substrate provided by an example of the present embodiment, the spacer strip has a cross section in any shape selected from the group consisted of trapezoid, triangle, semi-circular, step shape, and peak shape. But it is not limited thereto. The embodiments of the present invention will be described by way of the example that the cross section of the spacer strip is of trapezoid shape.

For example, as illustrated in FIGS. 3a, 3b, 4a and 4b, an array substrate provided by an example of the present embodiment may also include a second insulation layer 106 and a gate insulation layer 107. The second insulation layer 106 is located above the gate insulation layer 107 and below the first electrode 102 and the second electrode 103, and the plurality of spacer strips 104 are formed by a portion of the second insulation layer 106. That is, the plurality of spacer strips is formed by a film for forming the second insulation layer.

For example, as illustrated in FIG. 2a, an array substrate provided by an example of the present embodiment may further include a plurality of thin film transistors 112.

As illustrated in FIG. 3b, each of the thin film transistors includes a gate electrode 108, a gate insulation layer 107, an active layer 109, a source electrode 110 and a drain electrode 111.

As illustrated in FIGS. 3a, 3b, 4a and 4b, the gate insulation layer 107 is located below the first electrode 102 and the second electrode 103. The plurality of spacer strips 104 can be formed by a portion of the gate insulation layer 107. For example, the plurality of spacer strips 104 in FIG. 3a can be instead formed by a portion of the gate insulation layer 107. That is, the plurality of spacer strips is formed by a film for forming the gate insulation layer.

Second Embodiment

Figure 5:
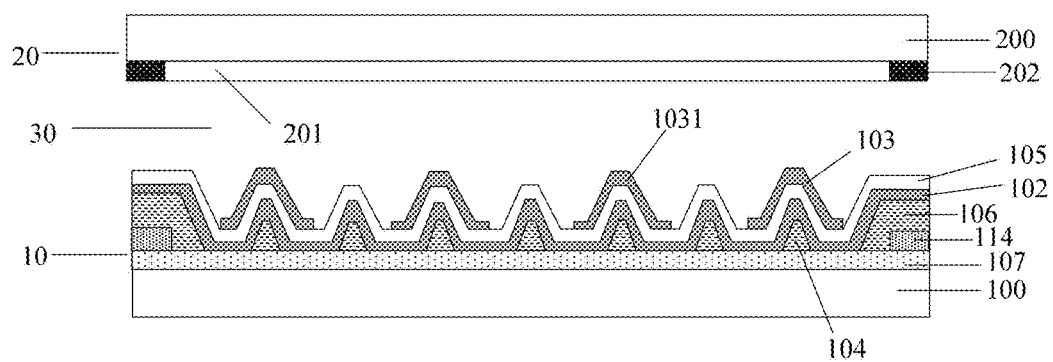
FIG. 5 is a schematic diagram illustrating a display panel provided by an embodiment of the present invention.

The present embodiment provides a display panel, as illustrated in FIG. 5, including the array substrate 10 as described in any one example of the first embodiment.

For example, as illustrated in FIG. 5, the display panel further includes a counter substrate 20 provided opposite to the array substrate, the counter substrate and the array substrate are respectively the upper and lower substrates of the display panel, and usually, the display structures including the array of the thin film transistors, etc. are formed on the array substrate and color resin is formed on the counter substrate.

For example, the counter substrate is a color filter substrate. For example, a black matrix 202 and a color film 201 are provided on the counter substrate 20. A layer of liquid crystal 30 is provided between the array substrate 10 and the counter substrate 20.

Third Embodiment

The present embodiment provides a display device including the display panel as described in any one example of the second embodiment.

For example, the display device can be a liquid crystal display and any product or component having display function and including these display devices, such as a television, a digital camera, a mobile phone, a watch, a tablet computer, a notebook, a navigator, and so on.

Hereinafter, the principle for improving the transmittance of the display panel by including the array substrate provided by the embodiments of the present invention will be described.

Figure 6:
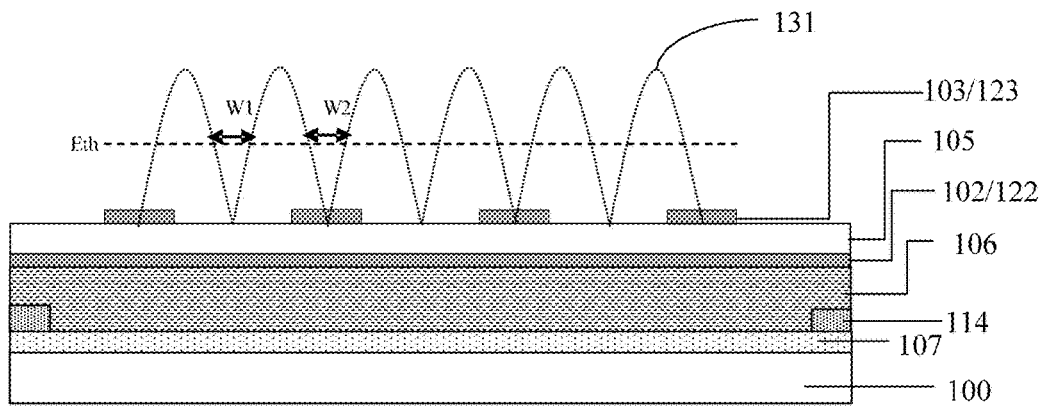
FIG. 6 is a schematic diagram illustrating intensity distribution of a horizontal electric field in a display panel.

FIG. 6 is a schematic diagram illustrating intensity distribution of a horizontal electric field in a conventional TFT-LCD of low power consumption ADS technology (for example, in the case that the pixel electrodes and the common electrodes are respectively formed their own planar structure layers, as show in FIG. 1). In the prior art, the intensity distribution of the horizontal electric field on pixels are illustrated in FIG. 6 by dashed line. In a middle area of the electric strips of the pixel electrodes and in a middle area between the electrode strips, the horizontal electric field is weakest, and accordingly, the transmittance is relative little, and finally, it will influence the transmittance of the whole panel. In FIG. 6, the areas corresponding to width w1 and w2 are the area in which the intensity of the horizontal electric field is less than a reference intensity value (Eth) of the electric field, in order to achieve high transmittance, the width w1 and w2 need to be as small as possible.

Figure 7:
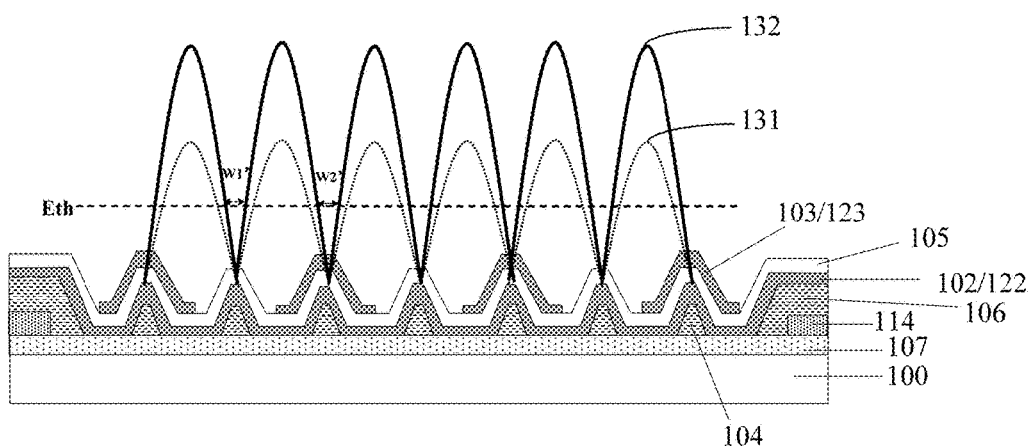
FIG. 7 is a schematic diagram illustrating intensity distribution of a horizontal electric field in a display panel provided by an embodiment of the present invention.

FIG. 7 is a schematic cross sectional diagram illustrating pixels in a low power consumption ADS type TFT-LCD according to the embodiments of the present invention. For example, the array substrate is constructed as illustrated in FIG. 3a, but is not limited thereto. The intensity distribution 132 of the horizontal electric field on the pixels in the embodiments of the present invention is illustrated at the uppermost side in FIG. 7 by solid line. The dash line in FIG. 7 indicates the intensity distribution 131 of the horizontal electric field on the conventional pixels. Under the same voltage condition, in the middle area of the electrode strips of the pixel electrodes and in the middle area between the electrode strips, the area in which the intensity of the horizontal electric field is less than the reference intensity value Eth of the electric field (w1', w2') is significantly less than the area (w1, w2) in the prior art in which the intensity of the corresponding horizontal electric field is less than the reference intensity value of the electric field. In the whole pixel area, the intensity of the horizontal electric field becomes larger, and thus the transmittance of the pixels is largely improved.

The pixel electrodes and the common electrodes have cross section in saw tooth shaped structure in a direction perpendicular to the direction of the plurality of the spacer strips. With the array substrate in this structure, the horizontal electric field in the pixel area can be enhanced, the longitudinal electric field can be suppressed, and at the same time, the areas of the middle area of each of the electrode strips of the pixel electrodes and the middle area between the electrode strips having relative weak horizontal electric field can be reduced, and thus the transmittance can be improved.

In addition, since the pixel electrodes and the common electrodes are in saw tooth structure, the storage capacitance between the pixel electrodes and the common electrodes can also be increased.

Figure 8:
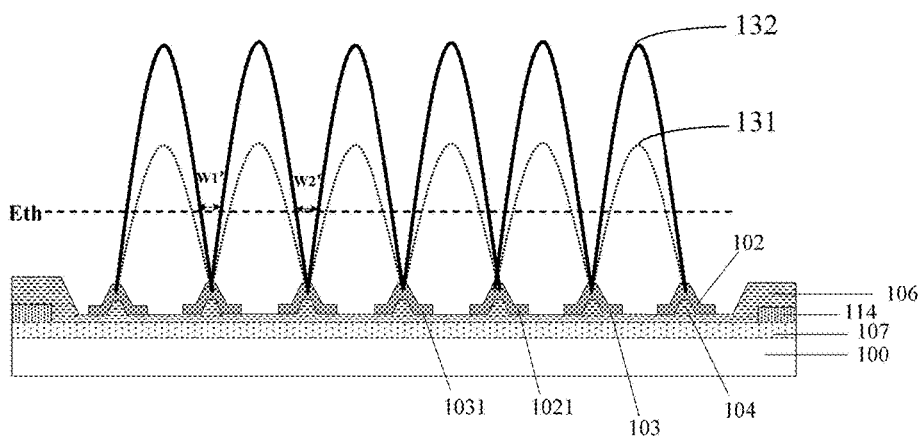
FIG. 8 is a schematic diagram illustrating intensity distribution of a horizontal electric field in a display panel provided by another embodiment of the present invention.

Similarly, as illustrated in FIG. 8, in the IPS mode display panel including the array substrate provided by the embodiments of the present invention can also reduce the area in which the intensity of the horizontal electric field is less than the reference intensity value (Eth) of the electric field accordingly, and in the whole pixel area, the intensity of the horizontal electric field becomes larger, and thus the transmittance of the pixels can also be largely improved.

In the embodiments of the present invention, by forming spacer strips for protruding the pixel electrodes and/or the common electrodes on the array substrate, the horizontal electric field is enhance, the longitudinal electric field is suppressed, and thus the transmittance can be improved.

It is to be noted that:

(1) The technical terms or science terms, as used herein, should be the common meaning as understood by the person skilled in the art, unless specially otherwise defined. The words "first," "second," or the like, as used herein, do not express any order, quality, or significance, but are only used to distinguish the different components. Likewise, the words "a," "an," "the," or the like do not express any limitation on quality, but only express the presence of at least one. The words "plurality of" express more than one. The words "include," "comprise," or the like, as used herein, indicate that the members or articles preceding these words covers the members or articles enumerated following these words and its equivalents, but do not exclude the presence of the other members or articles. The words "connect," "connect with," or the like do not limit physical or mechanical connections, but may include electrical connection, whatever directly or indirectly. The words "upper," "lower," "left," "right," or the like are only used to indicate the relative position relationship, and when the absolute position of the described subject is changed, the relative position relationship will be changed accordingly.

(2) In the embodiments and their attached drawings, only the structure related to the embodiments of the present invention are described and illustrated, other structure can be conceived by referring to conventional design.

(3) For clarity purpose, in the attached drawing illustrating the embodiments of the present invention, thickness of the layers and the areas are enlarged. It can be understood that when a member such as a layer, a film, an area, a substrate, or the like is referred to as being located above or below another member, the member can be directly located above or below the other member, or there can be a intervening member.

(4) The number of the electrode strips included in the first electrodes (common electrodes), the number of the electrode strips included in the second electrodes (pixel electrodes), and the number of the spacer strips, as illustrated in the attached drawings of the embodiments of the present invention, is not limited the number illustrated in the figures. The shape of the first electrodes (common electrodes) and the second electrodes (pixel electrodes) are not limited the shape illustrated in the figures.

(5) In the array substrate of the present disclosure, every sub pixel in all the sub pixels included in the array substrate may include a plurality of spacer strips, or part of the sub pixels in all the sub pixels included in the array substrate may include a plurality of spacer strips, there is no limitation thereon.

(6) The embodiments and the features in the embodiments of the present invention can be combined with each other unless conflicting with each other.

What has been described above is only the particular embodiments of the present invention, but the protection scope of the present invention should not be limited thereto, and within the scope disclosed by the present invention, many variations or substitutions can be easily conceived by the person skilled in the art, and all the variations and substitutions should be covered by the protection scope of the present invention. Therefore, the protection scope of the present invention should be defined by the following claims.

The present application claims the priority of a Chinese Patent Application No. 201510393397.X, filed on Jul. 7, 2015, the disclosure of which is entirely incorporated herein by reference, as a part of the present application.

The invention claimed is:

1. An array substrate, comprising a base substrate and a plurality of sub pixels arranged on the base substrate,
wherein each of the sub pixels includes a first electrode, a second electrode and a plurality of spacer strips,
wherein the plurality of spacer strips is provided below the first electrode and the second electrode, in each of the sub pixels,
wherein the first electrode includes a plurality of first electrode strips,
wherein the second electrode includes a plurality of second electrode strips,
wherein each of the second electrode strips covers an upper surface of a corresponding one of the plurality of spacer strips completely,
wherein the first electrode and the second electrode are provided at different layers,
wherein a first insulation layer is provided between the first electrode and the second electrode,
wherein the second electrode is located above the first electrode,
wherein in the layer in which the first electrode is located, at the positions corresponding to the plurality of spacer strips, each of the plurality of first electrode strips is provided on every other spacer strip, and
wherein two adjacent spacer strips respectively correspond to one of the plurality of first electrode strips and one of the plurality of the second electrode strips, and
wherein the plurality of spacer strips is disposed in the same layer.

2. The array substrate according to claim 1, wherein the spacer strips are of any shape selected from the group consisted of straight line shape, fold line shape, wave shape, saw tooth shape, and arc shape.

3. The array substrate according to claim 2, wherein the plurality of spacer strips is a plurality of straight line shaped spacer strips arranged in parallel.

4. The array substrate according to claim 2, wherein in each of the sub pixels, the first electrode and the second electrode each includes portions correspondingly provided above the plurality of spacer strips.

5. The array substrate according to claim 2, wherein in the layer in which the second electrode is located, at positions corresponding to the plurality of spacer strips, one of the second electrode strips is provided every other spacer strip.

6. The array substrate according to claim 1, wherein the plurality of spacer strips is a plurality of straight line shaped spacer strips arranged in parallel.

7. The array substrate according to claim 1, wherein in each of the sub pixels, the first electrode and the second electrode each includes portions correspondingly provided above the plurality of spacer strips.

8. The array substrate according to claim 7, wherein the portions of the first electrode and the second electrode correspondingly provided above the plurality of spacer strips are protrusions.

9. The array substrate according to claim 1, wherein in the layer in which the second electrode is located, at positions corresponding to the plurality of spacer strips, one of the second electrode strips is provided every other spacer strip.

10. The array substrate according to claim 1, wherein the second electrode is a slit electrode or a comb electrode.

11. The array substrate according to claim 1, wherein the first electrode and the second electrode have a cross section in saw tooth structure in a direction perpendicular to a direction of the plurality of spacer strips.

12. The array substrate according to claim 1, wherein the spacer strip has a cross section in any shape selected from the group consisted of trapezoid, triangle, semi-circular, step shape, and peak shape.

13. The array substrate according to claim 1, further comprising a second insulation layer and a gate insulation layer, wherein the second insulation layer is located above the gate insulation layer and below the first electrode and the second electrode, the plurality of spacer strips is formed by a portion of the second insulation layer.

14. The array substrate according to claim 1, further comprising a gate insulation layer, wherein the gate insulation layer is located below the first electrode and the second electrode, and the plurality of spacer strips is formed by a portion of the gate insulation layer.

15. The array substrate according to claim 1, further comprising a plurality of data lines and a plurality of gate lines provided on the base substrate, wherein the plurality of spacer strips included in each of the sub pixels is extended in a direction parallel with extension direction of the gate lines or the data lines, or an angle formed between the extension direction of the plurality of spacer strips and the extension direction of the gate lines or the date lines is an acute angle, or the plurality of spacer strips included in each of the sub pixels is divided into at least two groups, and the spacer strips in different groups are extended in different directions.

16. The array substrate according to claim 15, wherein the plurality of data lines and the plurality of gate lines are intersected to define the plurality of sub pixels arranged in an array.

17. A display panel comprising the array substrate according to claim 1.

18. A display device comprising the display panel according to claim 17.

* * * * *